(12) United States Patent
Jusseit

(10) Patent No.: US 7,908,788 B2
(45) Date of Patent: Mar. 22, 2011

(54) REDUCING BY-CATCH OF SEABIRDS

(75) Inventor: Hanfried Jusseit, Queensland (AU)

(73) Assignee: Huna Holdings Pty Ltd, Mapleton (AU)

( * ) Notice: Subject to any disclaimer, the term of this patent is extended or adjusted under 35 U.S.C. 154(b) by 146 days.

(21) Appl. No.: 11/722,790

(22) PCT Filed: Dec. 23, 2005

(86) PCT No.: PCT/AU2005/001973
§ 371 (c)(1),
(2), (4) Date: Jul. 7, 2007

(87) PCT Pub. No.: WO2006/066360
PCT Pub. Date: Jun. 29, 2006

(65) Prior Publication Data
US 2008/0307690 A1    Dec. 18, 2008

(30) Foreign Application Priority Data
Dec. 24, 2004   (AU) ................ 2004907324

(51) Int. Cl.
*A01K 85/02*   (2006.01)
(52) U.S. Cl. ........................... 43/43.2; 43/42.4
(58) Field of Classification Search ............. 43/43.2, 43/43.16, 44.2, 44.8, 42.4, 42.1; *A01K 85/02*
See application file for complete search history.

(56) References Cited

U.S. PATENT DOCUMENTS

| 2,242,708 | A |   | 5/1941 | Lancaster |
| 2,292,743 | A | * | 8/1942 | Cordry ............... 43/41.2 |
| 2,914,883 | A |   | 12/1959 | Kustusch |
| 4,023,300 | A |   | 5/1977 | Vieths |
| 4,133,132 | A | * | 1/1979 | Ellis et al. ........... 43/41 |
| 4,926,579 | A |   | 5/1990 | Jimenez |
| 4,928,421 | A |   | 5/1990 | Staudner |
| 5,131,183 | A | * | 7/1992 | Thayer et al. ....... 43/43.11 |
| 5,216,829 | A | * | 6/1993 | Morton ............... 43/42.06 |
| 5,274,946 | A |   | 1/1994 | Fusco |
| 5,337,509 | A |   | 8/1994 | Harold |
| 5,890,316 | A | * | 4/1999 | Rodgers et al. ...... 43/43.16 |

FOREIGN PATENT DOCUMENTS

| GB | 2215572 A | * | 9/1989 |
| GB | 2335584   |   | 9/1999 |
| JP | 02049533 A | * | 2/1990 |
| NZ | 280168    |   | 8/1998 |
| WO | WO 2005067711 A1 | * | 7/2005 |

* cited by examiner

*Primary Examiner* — Son T Nguyen
*Assistant Examiner* — Shadi Baniani
(74) *Attorney, Agent, or Firm* — Saliwanchik, Lloyd & Eisenschenk

(57) ABSTRACT

An apparatus for reducing by-catch of seabirds or turtles during fishing include a fish hook (220) and a barrier or shield (227) mounted in a position relative to the fish hook (220) such that the barrier (227) reduces or prevents hooking of a seabird or turtle by the fish hook or ingestion of the hook by a seabird or turtle. The apparatus includes a degradable component (226) that degrades when placed in water such that when the degradable component degrades the barrier moves away from the position relative to the fish hook or no longer exists to allow the fish hook to be taken by a fish. The degradable component (226) may be a retaining means or a mounting means. The degradable component may form part of, or all of, the barrier.

5 Claims, 10 Drawing Sheets

REDUCING BY-CATCH OF SEABIRDS

CROSS-REFERENCE TO RELATED APPLICATION

This application is the U.S national stage application of International Patent Application No. PCT/AU2005/001973, filed Dec. 23, 2005, which claims priority to Australian Patent Application No. 2004907324, filed Dec. 24, 2004, the disclosure of each of which is hereby incorporated by reference in its entirety.

FIELD OF THE INVENTION

The present invention relates to an apparatus for reducing by-catch of seabirds and turtles during fishing. The present invention also relates to a fish hook. The present invention further relates to an ingestion barrier or a hooking barrier to reduce by-catch of seabirds and turtles during fishing. The present invention also relates to a method of reducing by-catch of seabirds and turtles in fishing.

BACKGROUND TO THE INVENTION

Long line fishing is a widely practiced fishing technique that is used to catch large quantities of fish each year. Long line fishing involves setting very long fishing lines, in some instances up to 150 km in length, off a fishing boat. Each line may have hundreds or thousands of hooks suspended from a main line, with each hook being baited. As the main fishing line is fed off the rear of the boat, each baited hook slowly sinks through the water until it reaches its fishing depth. Long line fishing has proven to be an efficient technique for catching fish and as such forms an important role in feeding the world.

Although long line fishing is a very efficient technique for catching fish, it is unfortunately also responsible for the deaths of a very large number of seabirds and to a lesser extent, turtles, every year. In particular, seabirds, such as albatrosses, petrels and shearwaters are attracted to the long line fishing boats and dive for the baits as they are fed out from the rear of the fishing boat. Unfortunately, many seabirds become hooked by the hook to which the baits are attached in this process. Some studies have estimated that in excess of 300,000 seabirds die each year as a result of becoming hooked on long line fishing hooks. Typically, the seabirds dive for the bait, become hooked by the hooks and are drowned.

As well as being a conservation issue, it is also in the interest of the fishermen to avoid by-catch of seabirds. The by-catch of seabirds represents a loss of bait and hooks that could otherwise be used to catch fish. Furthermore, fisherman often utilise sightings of the seabirds to assist in location of the schools of fish that they are attempting to catch.

A number of conservation and government bodies as well as the fishing industry have provided recommendations on how to reduce by-catch of seabirds in long line fishing operations. These include:

Setting long line gear at night. Seabirds usually feed during the day. This has met resistance because it decreases fishing time;
Decrease lights that illuminate the water at night. The lights attract the birds and assist in helping the birds find the bait. Operating in darkened conditions represents an occupational health and safety issue;
Throw hooks into the water from the lee side of the boat. Hooks sink faster there than on the turbulent windward side;
Hauling gear as fast as possible and keep the line coming up at a steep angle to the surface;
Thaw bait completely because frozen bait floats;
Only use bait with deflated swim bladders, again to increase the speed at which the bait (and hook) sinks;
Use streamers to scare the birds away. Such streamers can be flown from the back of the boat over the areas where the long lines are being dropped;
Use weighted hooks & lines to help the hooks sink faster. This represents an occupational health and safety issue with lives being lost from the practice; and
Don't throw fish guts into the water before the long lines go into the water, wait until the lines are set.

The above measures have been shown to have limited and sometimes minimal effect, increase costs, are hazardous and reduce fishing productivity.

By-catch of seabirds may also be a problem in other fishing operations that use hooks to catch the fish.

BRIEF DESCRIPTION OF THE INVENTION

In a first aspect, the present invention provides an apparatus for reducing by-catch of seabirds during fishing, the apparatus including a fish hook and a barrier mounted in a position relative to the fish hook such that the barrier reduces or prevents hooking of a seabird by the fish hook or ingestion of the hook by a seabird, wherein said apparatus includes a degradable component that degrades when placed in water such that when the degradable component degrades the barrier moves away from the position relative to the fish hook or no longer exists to allow the fish hook to be taken by a fish.

Advantageously, the apparatus also acts in the same manner to reduce by-catch of turtles.

The barrier becomes completely separated from the hook or the fishing line after degradation of the degradable component. For example, the barrier sinks after degradation of the component has occurred. The barrier preferably also breaks down with the passage of time following detachment from the hook or line. This may occur by corrosion or dissolution or some other mechanism.

The degradable component may comprise the barrier itself. Alternatively, the degradable component may comprise part of the barrier. As a further alternative, the degradable component may comprise an additional component to the barrier.

Suitably, the degradable component degrades after a period of time after placing the apparatus in water. The period of time is suitably sufficiently long to enable the fish hook and a bait attached to the fish hook to sink below a diving depth of the seabirds and preferably below the general feeding range of turtles. Suitably, the period of time is greater than 1 minute, for example 1 min to 60 min, more suitably 5 min to 30 min, even more suitably 10 min to 30 min.

The barrier may be mounted to the fishing hook. In this fashion, the barrier is maintained in the position relative to the fish hook in which the likelihood of ingestion of the hook by a seabird or other hooking of the seabird is reduced and/or prevented. Alternatively, the barrier may be mounted to the fishing line attached to the hook.

In embodiments of the first aspect of the present invention, the barrier itself may comprise or include the degradable component. Alternatively, a mounting means for mounting the barrier to the hook may comprise or include the degradable component. As a further alternative, a retaining means for retaining the barrier in position relative to the hook may comprise or include a degradable component.

The barrier suitably functions to reduce or prevent the likelihood of a seabird being hooked by the fish hook by virtue of the barrier providing a physical barrier that prevents a seabird from biting down on the hook or swallowing the hook or being hooked on any other part of its body. Thus, the barrier may comprise a physical barrier that, when the barrier is mounted to the fish hook, reduces or prevents a seabird from biting down onto or swallowing the fish hook.

In some embodiments, the present invention may also reduce the likelihood of seabirds becoming hooked by means other than by ingestion, for example, by the hook becoming hooked in the skin or feathers of the seabird. In such cases, the barrier may also be described as a hooking barrier for reducing the likelihood of hooking of seabirds and turtles.

In a second aspect, the present invention provides an apparatus for reducing by-catch of seabirds during fishing, the apparatus including a fish hook and a barrier mounted to the fish hook, the barrier operative to prevent or reduce ingestion of the hook by seabirds or hooking of seabirds by the hook whilst the barrier is intact and mounted to the fish hook, the barrier including or comprising a degradable part that degrades when placed in water such that when the apparatus is placed in water the barrier or part thereof degrades such that the barrier or a part thereof becomes detached from the hook or is removed from the hook to enable the hook to be taken by a fish.

In accordance with the present invention, the barrier may be made entirely from a degradable material. Alternatively, part of the barrier may be made from the degradable material such that when the degradable material degrades, a part of the barrier that acts to reduce the likelihood of a seabird being hooked by the hook or of a seabird ingesting the hook, may be removed or detached from the fish hook. Alternatively, the barrier may include mounting means for mounting the barrier to the hook, with the mounting means being made from the degradable material. In this fashion, when the degradable mounting means degrades, the barrier is no longer attached to the hook and will tend to move away from the hook. As a further alternative, the barrier may be provided with retaining means for retaining the barrier in position and the retaining means is degradable in water.

The barrier may be formed with a mounting means. The mounting means may be, for example, a clip that clips to the hook. The clip may act to clip the barrier to the shank of the hook or to the bend of the hook or to the eye of a hook or to the barb of a hook. Alternatively, the hook may be provided with mounting means for mounting the barrier thereto. The mounting means may comprise an opening formed in or joined to the hook, with the opening receiving the barrier. Alternatively, the mounting means may comprise a clip formed on or joined to the hook.

As a further alternative, the barrier may be mounted to the hook by use of a suitable adhesive. The adhesive may degrade when placed in water. Suitably, the adhesive may be a water soluble adhesive.

In some embodiments, the barrier itself is degradable.

The degradable component may degrade in the following manner:

- The component may be made from a metal that undergoes rapid corrosion when placed in water;
- The component may be made from metal components that undergo rapid galvanic corrosion when placed in water;
- the component may be made from or include a metal or alloy that undergoes galvanic corrosion when the barrier is connected to the hook and placed in water;
- The component may be made from a water soluble material (for example, a food-based material such as a sugar based material or a salt based material), which starts dissolving when it is placed in water;
- The component may include a water soluble part that, when dissolved, allows at least those parts of the barrier that reduce the likelihood of hooking a seabird to fall apart and away from the hook;
- The component may be fabricated from several parts bonded together with a water degradable adhesive that degrades when placed in water, causing the parts of the barrier to fall away from the hook, leaving the hook free to function to catch fish.

In a third aspect, the present invention provides a hook for use in fishing characterised in that the hook includes a mounting means for mounting a barrier thereto, said barrier being effective to reduce or prevent hooking of a seabird by the fish hook or ingestion of the hook by a seabird.

In a fourth aspect, the present invention provides a hook for use in fishing characterised in that the hook includes an eye for attaching a fishing line thereto and an opening for receiving a barrier or a mounting means for a barrier or a retaining means for a barrier to thereby fix the position of the barrier relative to the hook. The opening for receiving the barrier is suitably located in or on the bend of the hook. However, the opening could also be located in or on the shank of the hook, on the eye of the hook or in or on the barb of the hook. The opening may be formed in the hook as part of the manufacturing process of the hook. Alternatively, the opening may be attached to the hook, for example, by welding an eyelet to the hook or by using an appropriate adhesive to secure an eyelet to the hook.

In a fifth aspect, the present invention provides a barrier for mounting to a fish hook to reduce the likelihood of the hook being ingested by seabirds or to reduce or prevent hooking of a seabird by the fish hook, the barrier including a member adapted to come into contact with a mouth of a seabird when the barrier is mounted to the hook to thereby reduce a likelihood of the seabird taking the hook into its mouth and becoming hooked by the hook, the barrier comprising or including a part that is degradable in water such that the barrier loses structural integrity a predetermined time after being placed in water.

In a sixth aspect, the present invention provides an ingestion barrier for mounting to a fish hook to reduce the incidence of hooks being ingested by seabirds, the ingestion barrier including a member adapted to come into contact with a mouth of a seabird when the ingestion barrier is mounted to the hook to thereby reduce the likelihood of ingestion by the seabird, the ingestion barrier comprising or including a part that is water soluble such that the ingestion barrier or part thereof dissolves after being placed in water.

In a seventh aspect, the present invention provides an apparatus for mounting to a fish hook to reduce the likelihood of the hook being ingested by seabirds or to reduce or prevent hooking of a seabird by the fish hook, the apparatus including a barrier and a degradable component that facilitates mounting or retention of the barrier in position relative to the hook wherein the barrier is adapted to reduce a likelihood of the seabird taking the hook into its mouth and becoming hooked by the hook when the barrier is mounted or retained in position relative to the hook, wherein the degradable component degrades in water and loses structural integrity such that the barrier can thereafter move away from the hook.

The barrier may be a shield that is adapted to be placed over a hook to shield the barb of the hook. The degradable component may be a retaining means for retaining the shield in position relative to the hook. In this embodiment, when the retaining means degrades and loses structural integrity, the shield can be removed from the hook. The shield suitably falls off the hook and is completely removed from the hook or the associated line to which the hook is attached.

The retaining means may be a pin.

The shield may include opposed surfaces that are positioned on either side of the hook and the pin passes through respective holes in the opposed surfaces to thereby facilitate retention of the pin in position relative to the hook. The pin may also pass through a hole or opening formed in the hook to more securely retain the hook in position relative to the hook.

In an eighth aspect the present invention provides a method for fishing including the steps of providing an apparatus as described hereinabove, baiting the hook and placing the apparatus and bait into a body of water whereby the bait and apparatus sinks below a diving level of seabirds and the ingestion barrier degrades and falls off the hook to thereby allow the hook to hook a fish.

The present invention also extends to use of a hooking barrier to reduce the likelihood of hooking a seabird. Thus, further aspects of the present invention are as described with reference to the first to seventh aspects of the invention but with the ingestion barrier replaced by a hooking barrier. It will also be understood that the hooking barrier may prevent ingestion and that the ingestion barrier may prevent hooking by other than ingestion.

DETAILED DESCRIPTION OF THE DRAWINGS

Figure 1:
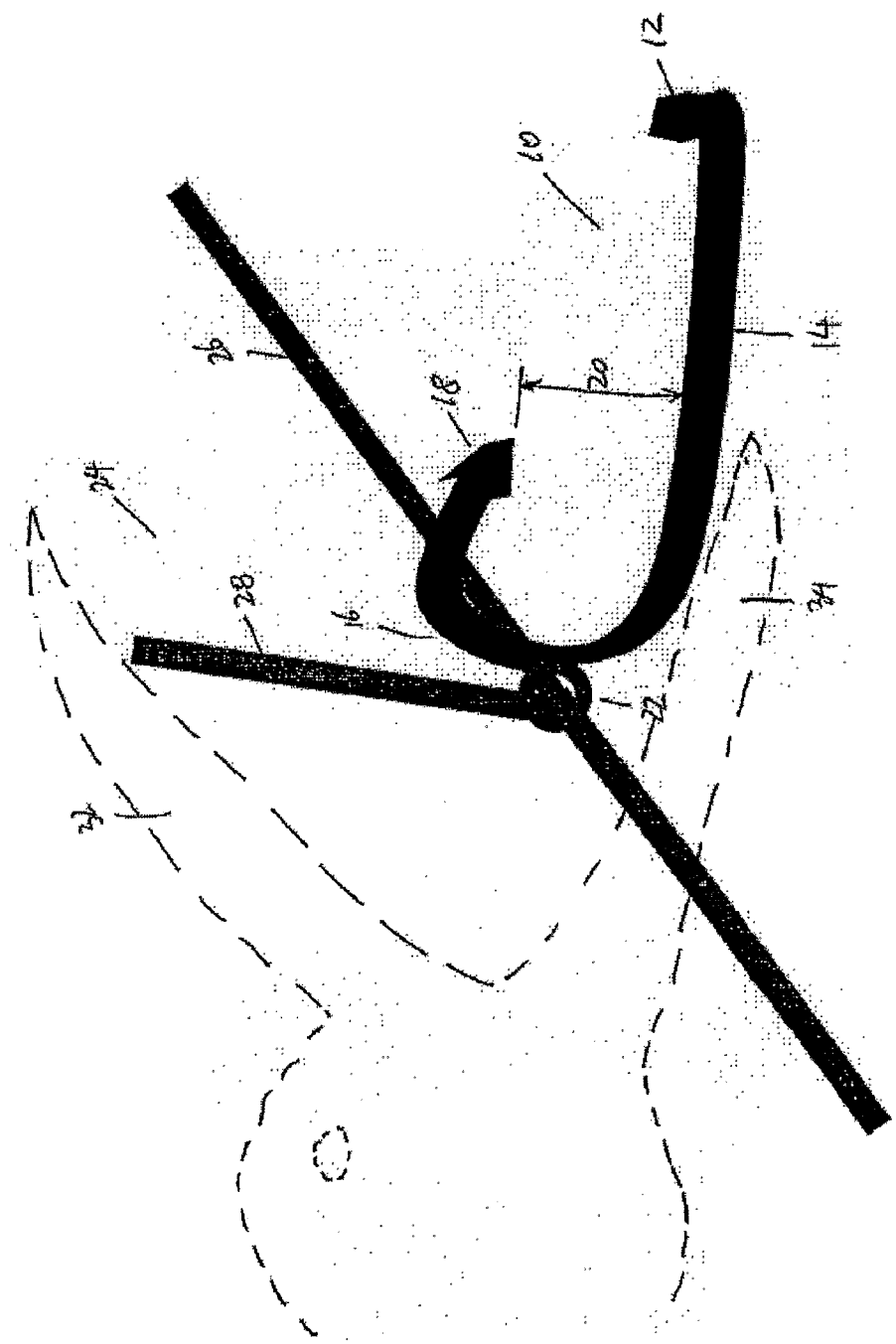
FIG. 1 is a perspective view of an apparatus in accordance with an embodiment of the present invention.

It will be appreciated that the drawings have been provided for the purposes of describing preferred embodiments of the present invention. Thus, the present invention should not be considered to be limited solely to the embodiments of the invention shown in the drawings.

FIG. 1 shows a combination of a fish hook and a barrier in accordance with the apparatus of the present invention. In FIG. 1, the hook 10 includes an eyelet 12. Eyelet 12 is used to attach the hook to a fishing line, such as a long line fishing line. The hook 10 further includes a shank 14, a bend 16 and a barb 18. The distance 20 between the barb 18 and shank 14 is normally referred to as the gape.

The fish hook 10 shown in FIG. 1 includes a further eyelet 22 that is attached to the bend 16 of the hook. Eyelet 22 may be attached to the bend 16 by welding, for example. Alternatively, eyelet 22 may be integrally formed with the hook 10 during the manufacturing process for making the hook 10.

The apparatus shown in FIG. 1 further includes a barrier 24. Barrier 24 includes a transversely extending member 26, which may be in the form of a bar. Bar 26 is sized such that it is snugly received in eyelet 22 such that the relative orientation and position between the ingestion barrier 24 and the hook 10 is maintained when the bar 26 is inserted into the eyelet 22.

The barrier 24 also includes a further bar 28 that extends essentially perpendicularly to bar 26.

In order to assemble the apparatus shown in FIG. 1, bar 26 is inserted through eyelet 22 until the eyelet is located substantially at the midpoint of bar 26. Suitably, further bar 28 comes into contact with eyelet 22 when the bar 26 is properly inserted into eyelet 22. In this fashion, the barrier 24 is mounted to the hook 10. It will be appreciated that the diameter of the opening in the eyelet 22 and the size of the external periphery of bar 26 are such that the bar 26 is snugly or tightly received inside the eyelet 22. Further, the orientation of the barrier 24 is such that the further bar 28 extends upwardly past the hook as shown in FIG. 1. For example, the further bar 28 may be positioned in or adjacent to an imaginary plane that passes along the length and height of the hook.

The barrier 24 provides a physical barrier that prevents a seabird from biting down onto the hook in a manner that would cause the hook to be either swallowed by the seabird or to pierce the inside of the seabird's mouth. For example, FIG. 1 shows an outline of a seabird and its open beak in dashed outline. As can be seen, the seabird 30 has an upper beak 32 and a lower beak 34. When the seabird tries to close its beak over the hook, the lower beak comes into contact with either the hook shank 14 or the bar 26 whilst the upper beak 32 comes into contact with the further bar 28. This prevents the seabird from closing its mouth around the hook, thereby reducing the likelihood of the seabird being hooked by the hook. The bar 26 also prevents the seabird from swallowing the hook.

Thus, the apparatus shown in FIG. 1 is effective to reduce the likelihood of a seabird being hooked by the hook 10. However, the barrier 24 may also act to prevent fish from hooking themselves on the hook. This is obviously an undesirable outcome for the owner of the fishing boat. To overcome this, the barrier 24 is made such that it is either wholly made from a material that degrades when placed in water or it includes one or more component parts that degrade in water, with the degradable parts being arranged such that when they degrade, the barrier 24 looses its structural integrity and effectively falls away from the hook, typically by sinking. In this fashion, the hook is then ready for catching fish.

The barrier 24 is suitably arranged such that the degradable part or parts degrade relatively quickly after being thrown into the water. Most suitably, the degradable parts degrade in a period of time that is just longer than the time required for the baited hook to sink below a diving depth at which seabirds can dive to collect food from the ocean. In this manner, the barrier remains intact until the baited hook has sunk below a depth at which it is accessible to seabirds. Once the baited hook has sunk below the depth to which seabirds can dive, the risk of incidental by-catch of seabirds on that hook is negligible and loss of the barrier from the hook to enable the hook to catch fish can occur.

In the embodiment shown in FIG. 1, the hook 10 and further eyelet 22 are suitably made from a metal, particularly a corrosion resistant metal, to thereby allow the hook and further eyelet to be reused a number of times. Stainless steel is a typical metal alloy used in the manufacture of fishing hooks. The barrier 24, in contrast, degrades and falls off the hook 10 after it has been placed in the ocean. Suitably, the barrier 24 is either biodegradable or will eventually completely corrode away in the ocean to thereby prevent the barrier 24 from forming an ongoing hazard to ocean life.

Figure 2:
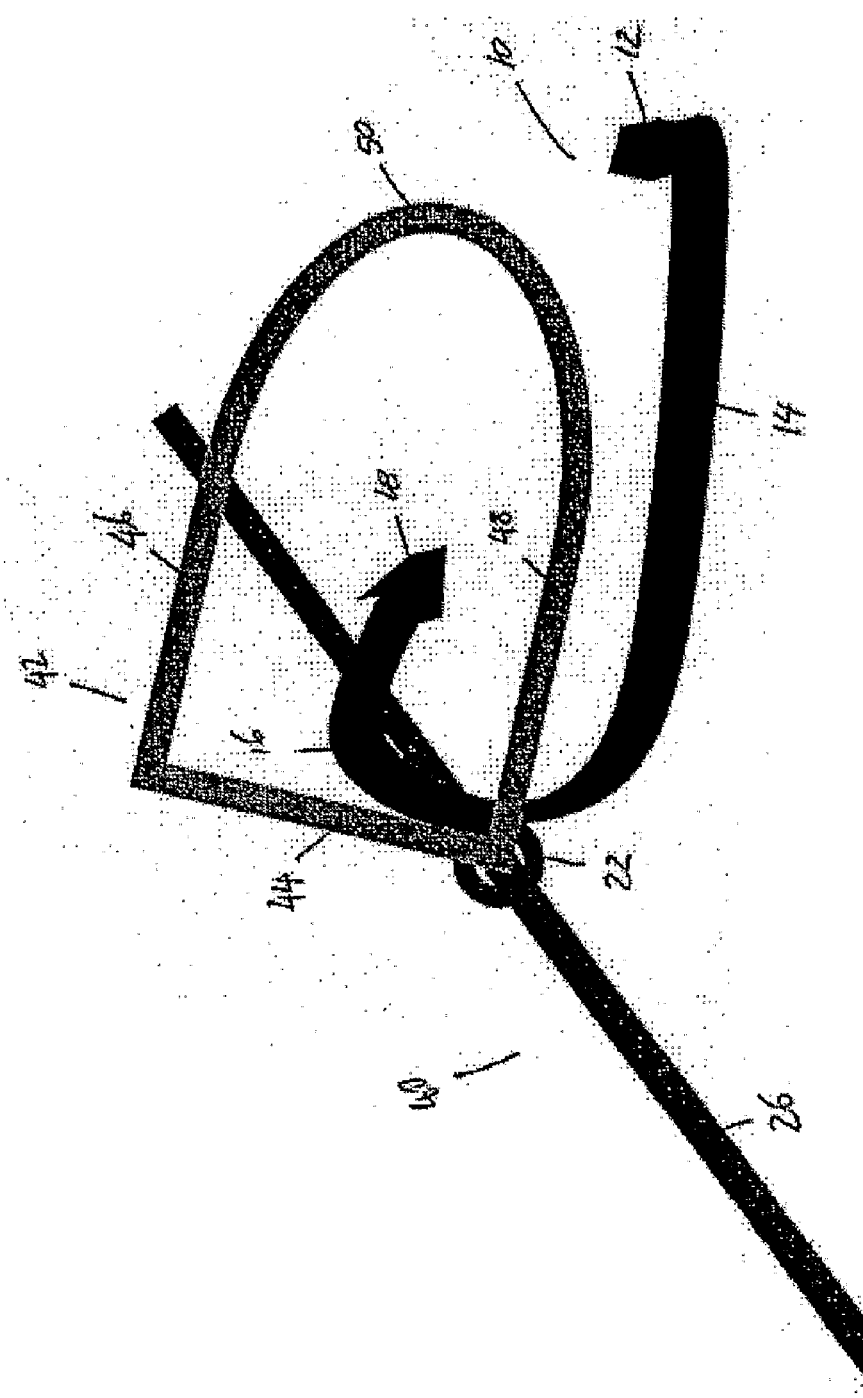
FIG. 2 is a perspective view of an apparatus in accordance with another embodiment of the present invention.

FIG. 2 shows another embodiment of an apparatus in accordance with the present invention. The embodiment shown in FIG. 2 shares a number of features in common with that shown in FIG. 1 and, for convenience, like parts have been referred to using like reference numerals. These like parts need not be described further.

The embodiment shown in FIG. 2 differs from that shown in FIG. 1 in that the barrier 40 in FIG. 2 includes bar 26 essentially as shown in FIG. 1 and a D-shaped member 42 extending from the bar 26. D-shaped member, in particular, includes a bar 44 that extends generally perpendicularly to bar 26. Orthogonal bars 46, 48 extend generally perpendicularly from either end of bar 44, with curved portion 50 joining the orthogonal bars 46, 48. The orthogonal bars 46, 48 and curved portion 50 extend from bar 44 in a direction that is generally parallel to the direction of the barb 18 of hook 10. In this fashion, the orthogonal bars 46, 48 and curved portion 50 points towards the eye of the hook which assists in preventing the barb of the hook from being exposed. The barrier used in FIG. 2 reduces the likelihood of the hook being ingested by a seabird. It also reduces the likelihood of external hooking of a seabird, foe example, by the hook becoming hooked in the leg or feathers of a seabird.

Figure 3:
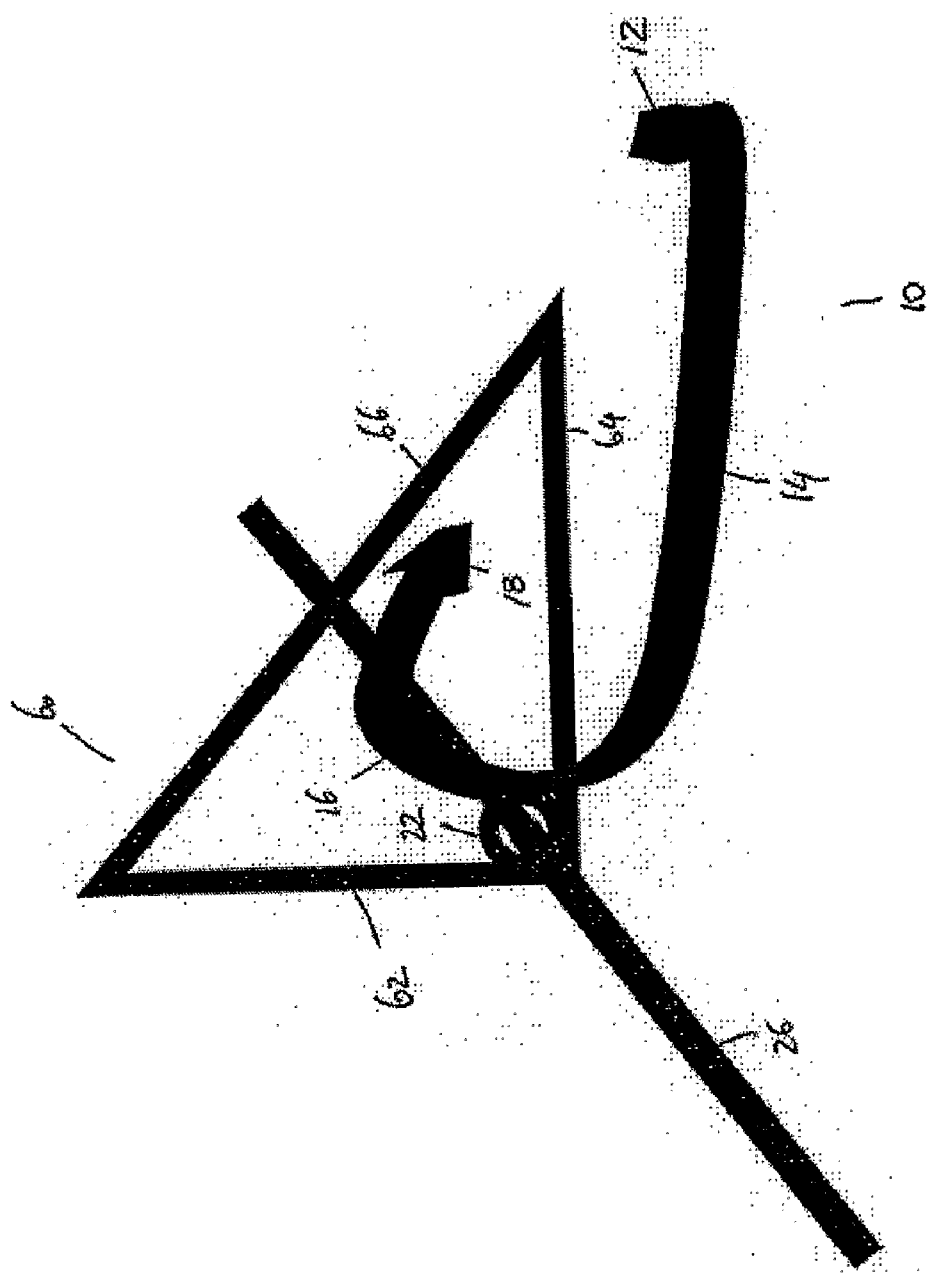
FIG. 3 is a perspective view of an apparatus in accordance with yet another embodiment of the present invention.

FIG. 3 shows a further embodiment of the apparatus in accordance with the present invention. The embodiment shown in FIG. 3 shares a number of features in common with that shown in FIG. 1. For convenience, like features are denoted by like reference numerals and need not be described further. However, the embodiment shown in FIG. 3 includes a barrier 60 that includes bar 26, a bar 62 that extends generally orthogonally to bar 26 and further bars 64, 66. Bars 62, 64, 66 define a triangle that points towards the eyelet 12 of fork 10 to thereby provide protection from the barb 18 of hook 10. The barrier used in FIG. 3 reduces the likelihood of the hook being ingested by a seabird. It also reduces the likelihood of external hooking of a seabird, foe example, by the hook becoming hooked in the leg or feathers of a seabird.

Figure 4:
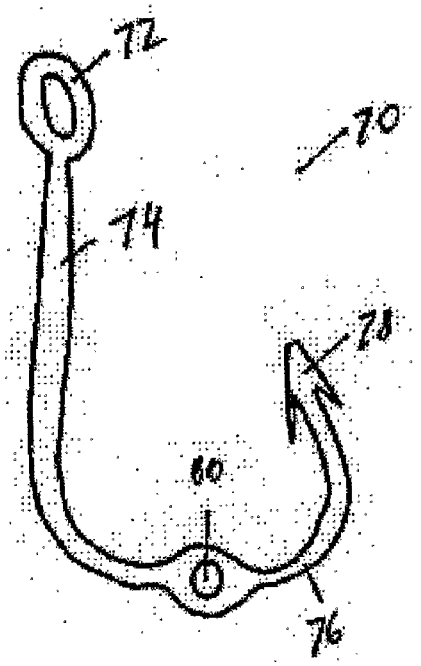
FIG. 4 is a side view of a fish hook in accordance with an embodiment of the present invention.

FIG. 4 shows a hook 70 in accordance with an embodiment of the present invention. Hook 70 includes an eyelet 72, a shank 74, a bend 76 and a barb 78. Hook 20 also has an opening 80 formed in the bend 76. Opening 80 is suitably formed in the hook 70 during the process of manufacturing the hook. This can avoid the separate step of having to join a further eyelet to the hook. Opening 80 can receive the bar 26 shown in the embodiments of FIGS. 1-3.

Figure 5:
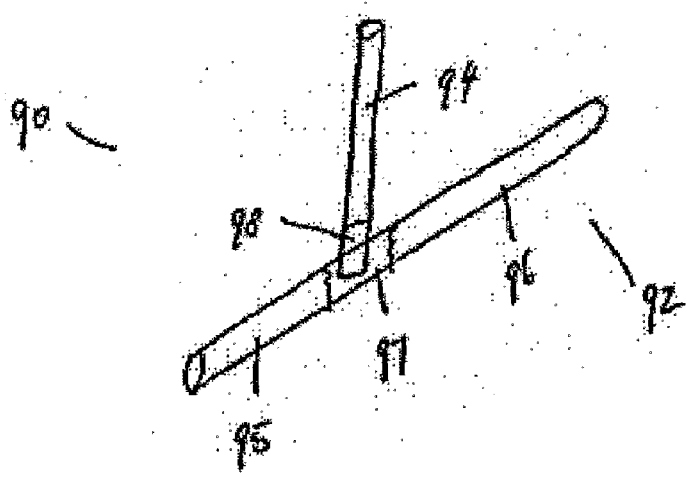
FIG. 5 is a perspective view of an ingestion barrier in accordance with an embodiment of the present invention.

FIG. 5 shows an embodiment of another barrier in accordance with the present invention. The barrier shown in FIG. 5 is generally similar to the barrier 24 shown in FIG. 1. However, the barrier 90 shown in FIG. 5 includes bar 92 and orthogonally extending bar 94. Bar 92 is made from a first bar component 95 and a second bar component 96 that are joined together by a region of adhesive 97. Similarly, bar 94 is joined to the bar 92 by another region of adhesive 98. Alternatively, bar 92 may be formed as part of component 95 or component 96. The adhesive used in regions 97 and 98 is a water soluble adhesive. Thus, when the barrier 90 shown in FIG. 5 is positioned on a hook (for example, as shown in FIG. 1) and thrown into the ocean, the regions 97, 98 of water soluble adhesive start to dissolve. When the regions 97, 98 have dissolved to a certain extent, they lose their structural integrity (this may occur when the regions are fully dissolved or only partly dissolved but sufficiently weakened such that the weight or drag of the barrier can no longer be resisted) and the bar portions 94, 95 and 96 simply fall away from the hook.

Figure 6:
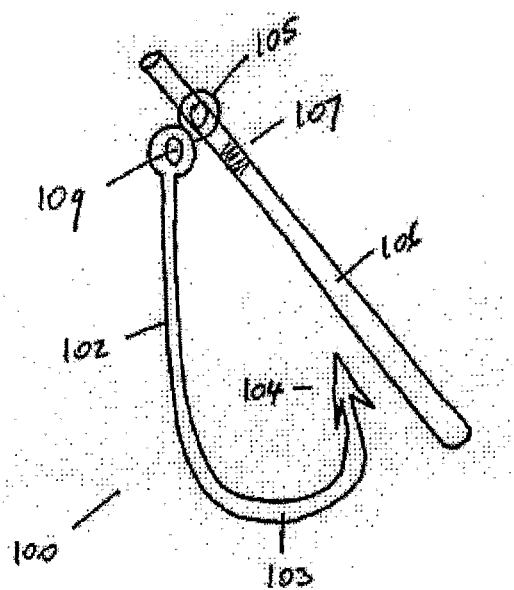
FIG. 6 shows a side view of an apparatus in accordance with another embodiment of the present invention.

FIG. 6 shows a further embodiment of a combination of a hook and barrier in accordance with the present invention. In FIG. 6, a hook 100 includes an eyelet 109, a shank 102, a bend 103 and a barb 104. An additional eyelet 105 is either joined to or formed with the eyelet 101. Eyelet 105 receives a bar 106, which, in the embodiment shown in FIG. 6, constitutes the barrier. Bar 106 is snugly or tightly received in eyelet 105 such that the bar 106 remains in its relative position compared to the hook 100.

As can be seen from FIG. 6, bar 106 extends from the eyelet 105 down past the bar 104. Thus, the bar 106 prevents a seabird from closing its mouth around the hook 100 to thereby reduce the likelihood of the seabird being hooked by the hook 100. The barrier used in FIG. 6 also reduces the likelihood of external hooking of a seabird, foe example, by the hook becoming hooked in the leg or feathers of a seabird.

The bar 106 may be suitably made from a degradable material, such as a water soluble product. Alternatively, bar 106 may include a region 107 that is degradable in water (for example, by dissolution or by galvanic corrosion). When region 107 is degraded to a certain extent, it loses it structural integrity and the lower part of bar 106 falls away to thereby expose the bar 104 of hook 100, allowing the hook to catch fish.

Figure 7:
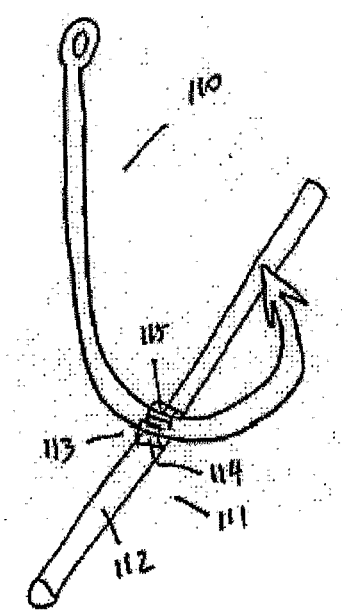
FIG. 7 shows a perspective view of an apparatus in accordance with another embodiment of the present invention.

FIG. 7 shows a further embodiment of the present invention. In FIG. 7, the hook 110 comprises a standard long line fishing hook. The barrier 111 includes bar 112 having a clip 113 formed thereon. Clip 113 includes arms 114, 115. In order to affix the ingestion barrier 111 to the hook 110, the arms 114, 115 of clip 113 are snapped over the bend of the hook 110. This acts to mount the barrier 111 to the hook 110.

In order to enable the barrier 111 to separate from the hook 110 once it has been placed into the ocean and has sunk below the diving depths of seabirds, either the clip 113 may be made from a degradable material or part of the bar 111 may be made from a degradable or all of the barrier 111 may be made from a degradable material.

Figure 8:
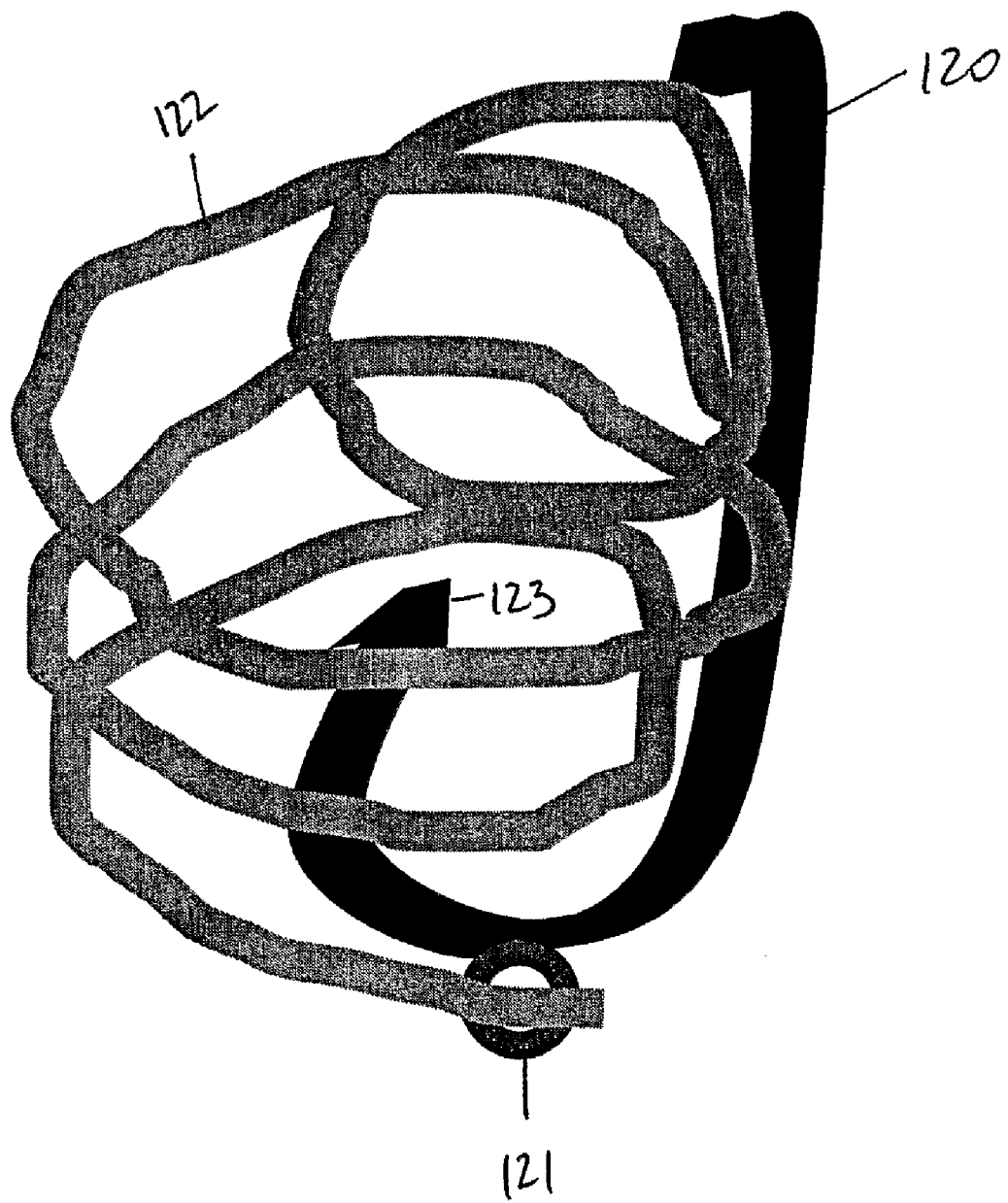
FIG. 8 is a perspective view of an apparatus in accordance with another embodiment of the present invention.

FIG. 8 shows a further embodiment of the present invention. In FIG. 8, a hook 120 having eyelet 121 joined to the bend thereof has a coiled hooking barrier 122 inserted into the eyelet 121. This acts to retain the hooking barrier 122 in position relative to the hook. As can be seen from FIG. 8, the hooking barrier 122 includes a coiled portion that extends over and around the barb 123 of hook 120. In this manner, the hooking barrier 122 prevents the barb of the hook from hooking into the skin or feathers of a seabird. The hooking barrier 122 may also be sized such that it prevents the hook being ingested by the seabird. The hooking barrier is degradable in water.

Figure 9:
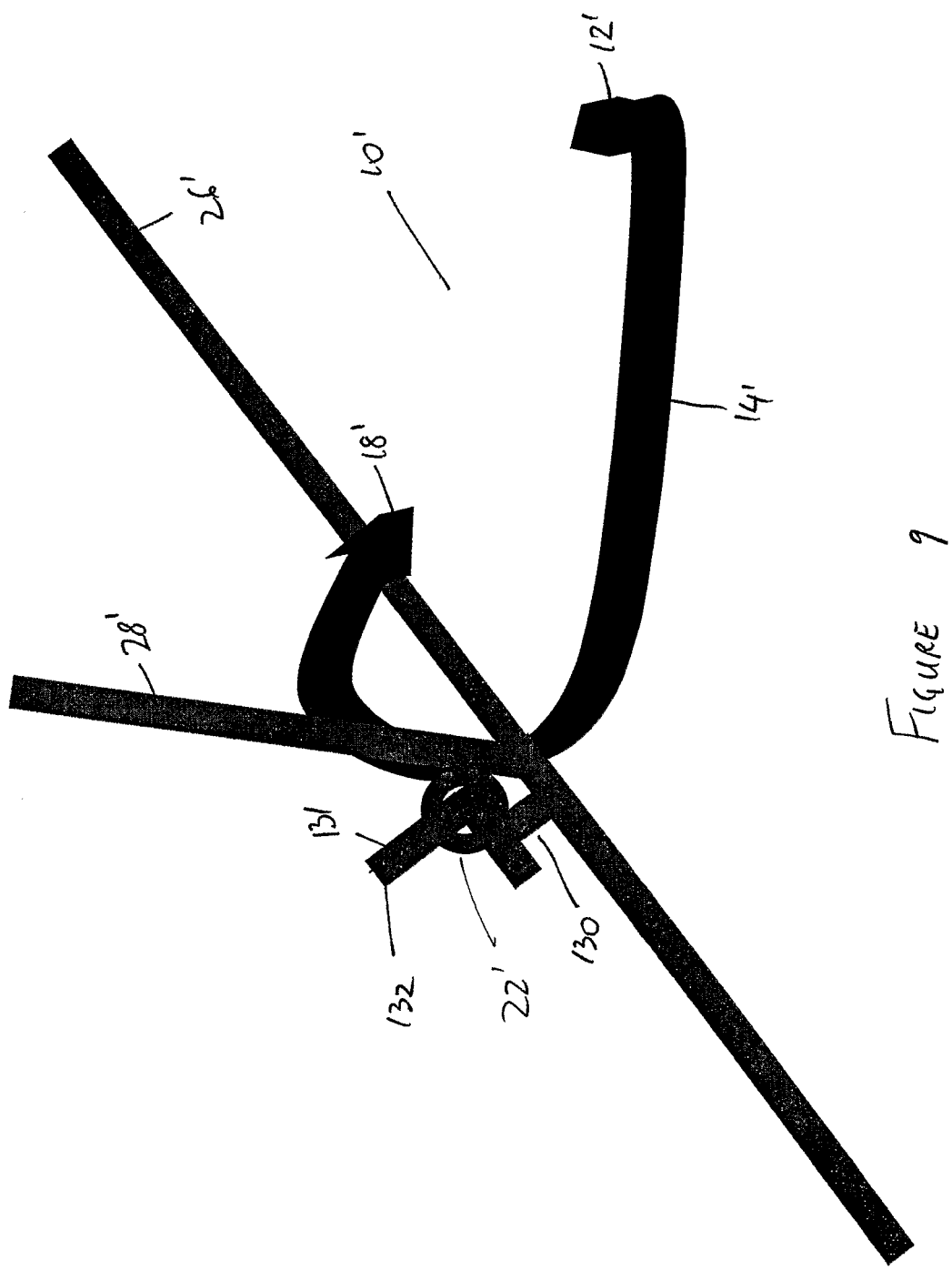
FIG. 9 is a perspective view of an apparatus in accordance with another embodiment of the present invention.

FIG. 9 shows a further embodiment of the present invention that has many features in common with the embodiment shown in FIG. 1. For convenience, like reference numerals will be used to denote like parts but with a ' added. These parts need not be described further. The embodiment of FIG. 9 differs from that of FIG. 1 in that the hooking barrier or ingestion barrier includes a short bar extending from bar 26'. Bar 130 includes a right angle extension 131 that is inserted through eyelet 22' to mount the barrier to the hook and to retain the barrier in the correct position relative to the hook to reduce the likelihood of the hook hooking a seabird, either by ingestion or otherwise. The free end 132 of extension 131 can be bent around the eyelet 22' to minimise the chance of the barrier becoming prematurely detached from the hook.

The barrier may be degradable in water, or the extension 131 may be degradable in water.

In the embodiments of the invention shown in FIGS. 1-9, the ingestion barrier or hooking barrier comprise a single use item whilst the hook comprises a reusable, multi-use item. This is especially suitable for modem day fishing operations in which it has been estimated that over a billion long line hooking operations take place each year around the world. To supply a fishing boat with sufficient quantities of material needed to fish with a reduced likelihood of hooking seabirds as a by-catch, the fishing boat need only be provided with a similar number of hooks to that which it would presently carry. The fishing boat should also be provided with a number of ingestion barriers/hooking barriers equivalent to the number of hooking operations anticipated to be conducted during the particular voyage of the fishing boat.

The ingestion barriers/hooking barriers suitably constitute an inexpensive, easily mounted, single use item that addresses the environmental concerns of seabird by-catch issues without adding significantly to the cost of fishing or to the labour involved in setting and baiting the fishing lines. Indeed, mounting the barriers to the hooks can be as simple as inserting a bar into an eyelet or opening in the hook. Thus, environmental issues and the needs of the fishermen are met by the present invention.

Advantageously, the present invention also may assist in reducing the by-catch of turtles from long line fishing operations.

Although the present invention has been described with reference to its use in long line fishing operations, it will be appreciated that the present invention can be used to minimise the by-catch of seabirds in any fishing operation that utilises fish hooks.

Those skilled in the art will appreciate that the present invention may be susceptible to variations and modifications. For example, the embodiments shown in FIGS. 1-9 describe the barrier as including a degradable part or being made as a degradable part. It may be possible that a separate clip may be used to connect the ingestion barrier to the hook. That separate clip may, for example, include a first receiving means for receiving and holding the hook and a second receiving means for receiving and holding the barrier. That clip may constitute a degradable component. Alternatively, the barrier may be mounted to the hook by use of a water soluble adhesive. Furthermore, the invention also encompasses the use of any particular hook described herein in combination with any particular ingestion barrier or hooking barrier described herein.

The component that is degradable in water may be made from a water soluble product, such as a food product (for example, a sugar based product or a salt based product). Alternatively, it may be made from a metal composition that undergoes rapid galvanic corrosion when placed in the ocean or other body of water. In some embodiments, the galvanic corrosion reaction may occur when the barrier is in electrical contact with the hook and placed in water. The degradable component may also comprise a water soluble adhesive that is used to secure the ingestion barrier to the hook or used to manufacture the ingestion barrier from two or more ingestion barrier components. In this fashion, when the water soluble adhesive dissolves, the ingestion barrier falls apart and falls away from the hook.

Figure 10:
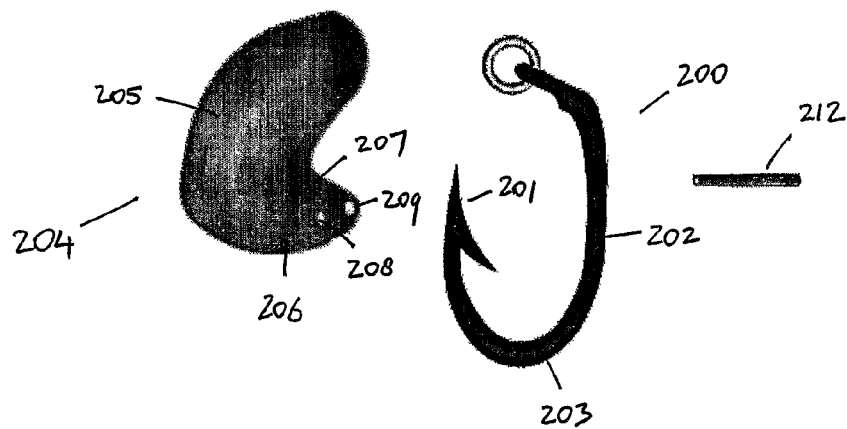
FIG. 10 shows the components for use in another embodiment of the present invention.

FIGS. 10 to 13 show various views of a further embodiment in accordance with the present invention. FIG. 10 shows the components used in this embodiment. The components include a standard fish hook 200 having a barb 201, a shank 202 and a bend 203. The components also include a barrier 204 which is in the form of a shield 205. Shield 205 is suitably made from mild steel, especially mild steel sheet or plate, or any other material that will dissolve with little or no environmental residue. Shield 205 may be formed by stamping.

Shield 205 includes two opposed surfaces 206, 207. Respective holes 208, 209 are formed in opposed surfaces 206, 207.

Figure 11:
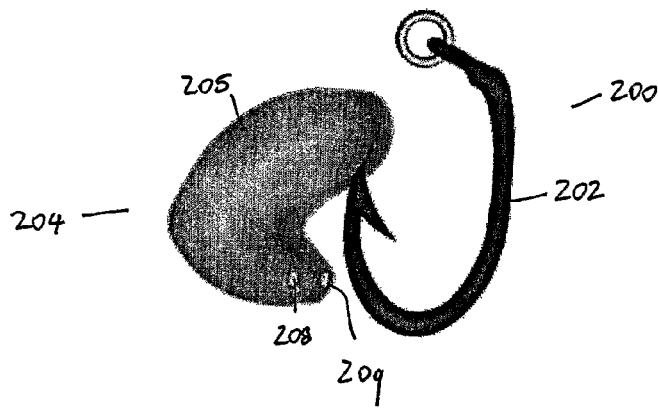
FIG. 11 shows the process of fitting the barrier to the hook in the embodiment shown in FIG. 10.
Figure 12:
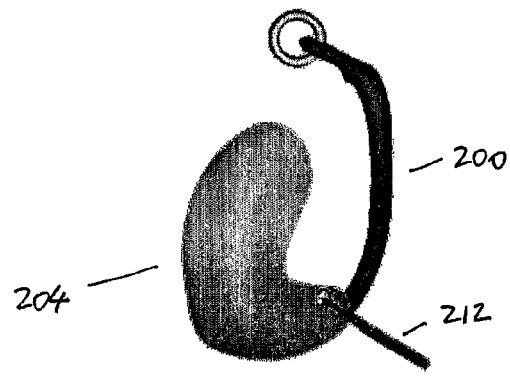
FIG. 12 shows the barrier fitted to the hook.

FIGS. 11 and 12 show placement of the barrier 204 onto the hook 200. In particular, placement is as simple as positioning the barrier 204 over the barb 201 of hook 200 and moving the lower part of the barrier 204 (as shown in the orientation given in FIGS. 11 and 12) towards the shank 202 of the hook 200. When the holes 208, 209 are positioned within the curve of the hook shank (as shown in FIG. 12), a fastening pin 212 is inserted through the holes 208, 209. The combination of the shape of the shield 205, the retaining pin 212, the shape of the hook 200 and the position of the hook barb 201 acts to retain the barrier 204 in position whilst retaining pin 212 remains in the holes 208, 209.

The retaining pin 212 may be made from a metal alloy that undergoes rapid galvanic corrosion. In this regard, it will be understood that the hook 200 will typically be made from stainless steel and that the shield 205 is made from mild steel. Thus, the pin 212 is in contact with the mild steel shield 205 and is also in electrical contact with the stainless steel hook 200. The alloy from which the retaining pin 212 is made is chosen to be an alloy that has a low potential (or active potential) on the electrochemical scale. Accordingly, when placed in seawater, the retaining pin 212 undergoes rapid galvanic corrosion and loses its structural integrity, typically within a time span that is chosen to be from one minute to sixty minutes, more suitably between ten minutes and thirty minutes. This provides sufficient time for the baited hook with the shield in place to sink below a diving depth of sea birds.

After the combination of hook, barrier and retaining pin has been immersed in seawater for a period of time, the retaining pin undergoes sufficient galvanic corrosion to cause it to lose its structural integrity. Thus, the retaining pin can no longer function to retain the barrier 204 on the hook 200. The barrier can then simply fall away from the hook 200. As the barrier 204 is made from mild steel, it will sink to the depths of the ocean, where it will completely corrode away with the passage of time, thereby leaving no environmentally unfriendly residue products.

Figure 13:
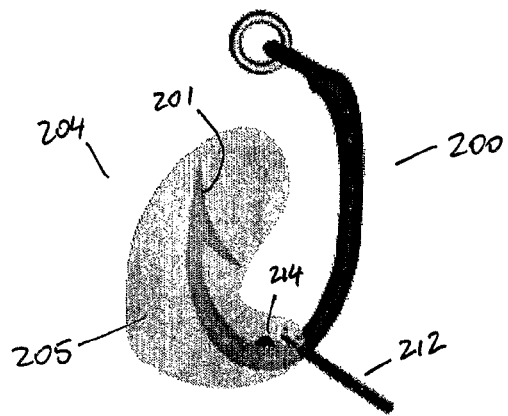
FIG. 13 shows a similar view to FIG. 12, but with the barrier drawn as a transparent item so that the relative position of the barrier and the hook can be seen.
Figure 13A:
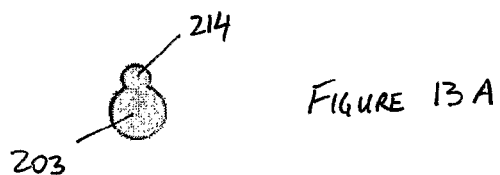
FIG. 13A is a cross-sectional view through the bend of the fish hook shown in FIG. 13.

FIG. 13 shows a diagram in which the barrier 204 has been shown in a transparent form such that the juxtaposition of the hook, retaining pin and barrier can be seen. FIG. 13 also shows a modified hook that includes a lump or pimple 214 located in the shank region of the hook. Lump or pimple 214 assists in preventing the retaining pin 212 from undesirably moving upwardly towards the barb of the hook. This further assists in retaining the barrier on the hook. A cross-sectional view showing the hook and pimple is shown in FIG. 13A.

Figure 14:
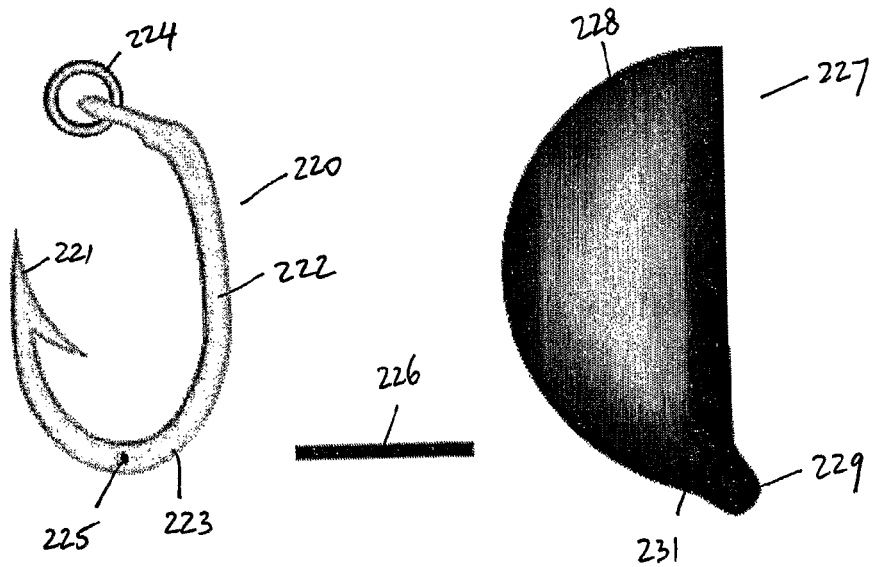
FIG. 14 shows a view of the components used in another embodiment of the present invention.

FIGS. 14 to 17 show a further embodiment of the present invention. FIG. 14 shows the components used in this particular embodiment. The components include a hook 220 having a barb 221, a shank 222 and a bend 223. Hook 220 also includes an eye 224 that allows the hook to be secured to a fishing line. The hook 220 further includes a hole or opening 225 positioned in the bend of the hook.

The components further include a retaining pin 226, which suitably is of similar construction to the retaining pin 212 described with reference to the embodiment shown in FIGS. 10 to 13.

Figure 15:
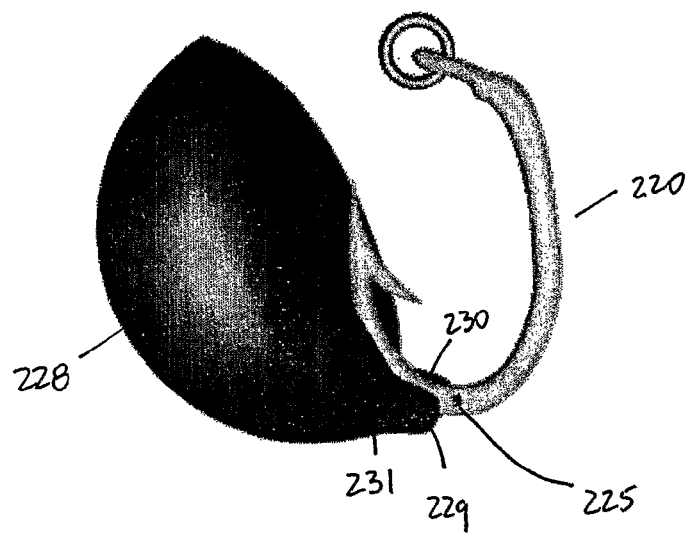
FIG. 15 shows the process of fitting the barrier to the hook for the embodiment shown in FIG. 14.

The components further include a barrier 227 which is in the form of a shield 228 having a generally hemispherical shape. Opposed surfaces 229, 230 of the shield 228 are each provided with holes, one of which 231 is shown in FIGS. 14 to 16.

Positioning and placement of the barrier 227 onto the hook 200 is similar to that as described with reference to the embodiment shown in FIGS. 10 to 13. However, it differs in that the hole 231 and its associated hole in its opposed surface 230 is brought into alignment with hole 225 in the bend 223 of hook 220. Retaining pin 226 is then inserted through the holes in opposed surfaces 229, 230 of shield 228 and also through the hole 225 in the bend 223 of the hook 220. This acts to thereby retain the shield 228 in position. Again, the dimensions of the shield and the hook and the action of the retaining pin act to retain the shield in place. In particular, the opposed surfaces 229, 230 of the shield 228 are spaced apart by a distance that is very similar to or even slightly smaller than the diameter of the hook. As a result, the opposed surfaces 229, 230 lightly grip onto the hook when they are in position to thereby resist rotation of the shield relative to the hook when the retaining pin is in place. It will be understood that the force applied by the opposed surfaces to the hook is not strong enough to securely retain the shield in place on the hook without the retaining pin also being present.

Figure 16:
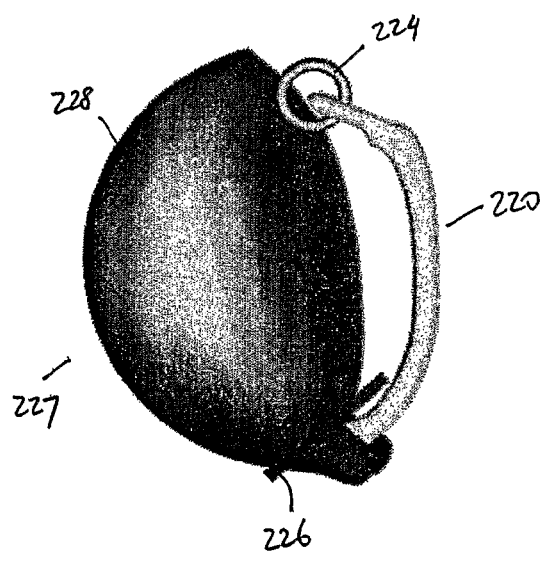
FIG. 16 shows a side view of the barrier fitted to the hook.
Figure 17:
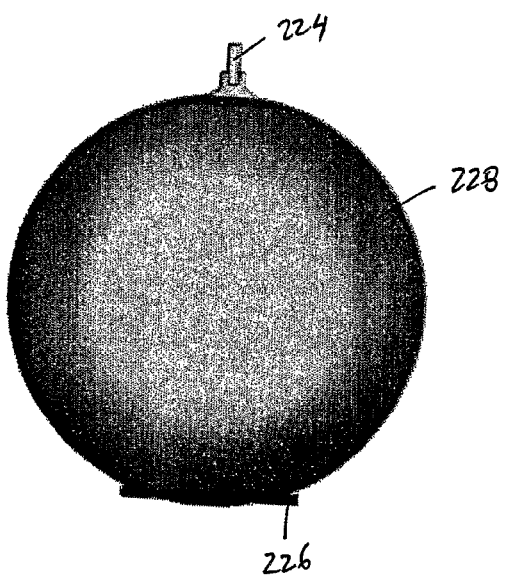
FIG. 17 shows a front view of the barrier when fitted to the hook.

As can be seen from FIGS. 16 and 17, the shield provides a large barrier to ingestion of the hook by sea birds. Further, the shield prevents access to the hook whilst the shield is in a position shown in FIGS. 16 and 17, which also acts to reduce the likelihood of a sea bird becoming hooked in the feathers or the leg by the barb of the hook.

As is common with the embodiment shown in FIGS. 10 to 13, the retaining pin 226 used in the embodiments shown in FIGS. 14 to 17 will undergo rapid galvanic corrosion when placed in seawater. Thus, the retaining pin will lose its structural integrity. After that, the shield 228 is free to detach from and move completely away from the hook and the line to which the hook is attached. Typically, the shield 228 will sink into the depths of the ocean. The shield 228 is suitably made from mild steel or other material that will not leave a residue and thus, it will completely corrode or dissolve away in the depths of the ocean with the passage of time.

The shields shown in the embodiments of FIGS. 10 to 17 may be simply made by stamping mild steel sheet or mild steel plate. Thus, the barriers will be very inexpensive to manufacture. Moreover, the barriers represent an environmentally friendly and effective apparatus for reducing the by-catch of seabirds in fishing operations, especially long line fishing operations. The shield is very simple to fix to the hook and will not unduly increase the time required to set lines, nor unduly increase the cost of fishing.

EXAMPLE

Corrosion tests were conducted to determine the corrosion rate of some metal alloys that had been identified as potential materials for incorporation into the barrier or used as the retaining pin of the present invention. Galvanic corrosion was selected as the mode by which the alloy would degrade. Thus, corrosion tests were conducted by coupling the metal alloys to stainless steel or to mild steel.

The properties of the metal or alloy that were targeted in selecting the metal or alloy were high strength and a very negative (or active) potential on the galvanic series in sea water compared to stainless steel and mild steel. Galvanic anode alloys were initially selected. Some known galvanic anode alloys are given in Table 1 (the information in Table 1 has been taken from AS 2239-2003):

TABLE 1

Typical properties of some galvanic anode alloys:

| | Open circuit potential, Ea Reference electrode | | Typical anode consumption rate in sea water | Typical anode consumption rate in soil | Typical anode consumption rate hot drinking water |
|---|---|---|---|---|---|
| Anode alloy type | Cu/CuSO4 | Ag/AgCl | kg/A · year | kg/A · year | kg/A · year |
| Zinc | −1.1 V | −1.05 to −1.15 V | 12 | 12 | Not used |
| Magnesium: | | | | | |
| high potential | −1.7 V | −1.65 V | Not used | 7 | 6 |
| low potential | −1.5 V | −1.45 V | Not used | 7 | 6 |
| Aluminium | −1.05 to −1.1 V | −1.00 to −1.05 V | 3.5 | Not used | 6 |

NOTES:
1 Magnesium anodes are not suitable for long term protection in sea water.
2 Copper sulphate reference electrodes are not recommended for prolonged use in sea water.

Magnesium anodes have a high negative driving potential which makes them suitable for the protection of steel structures where the environment has a high resistivity such as in soil and fresh water. Magnesium anodes are used extensively for the protection of buried pipelines, and also in hot and cold potable water applications and condensers, because their corrosion by-products are non-toxic.

The following alloys were identified as suitable alloys for incorporation into the barrier:

Alloy M1 (0.1-Al, 0.2-Zn, 0.5-1.3-Mn, 0.05-Si, 0.02-Cu, 0.03-Fe, 0.001-Ni, 0.04-Ca, Mg wt %) is a high potential anode material and is generally used for high resistivity soils and waters.

Alloy M2 (2.5-3.5-Al, 0.7-1.2-Zn, 0.2-1.5-Mn, 0.05-Si, 0.006-Cu, 0.003-Fe, 0.001-Ni, 0.04-Ca, Mg wt %)

Alloy M3 (5.3-6.7-Al, 2.5-3.5-Zn, 0.25-0.4-Mn, 0.05-Si, 0.05-Cu, 0.03-Fe, 0.003-Ni, 0.04-Ca, Mg wt %) which are used in medium resistivity soils and water.

Alloy AZ61 (6.4-Al, 0.9-Zn, 0.2 Mn, Mg wt).

Corrosion tests were conducted by coupling the selected alloys to either fish hooks made from 420 series stainless steel or mild steel. Sea water was obtained in the Gold Coast Seaway Australia on the second half of the incoming tide and its temperature was maintained at 21° C. throughout the experiments. Weights of samples were measured using a Mettler AE260 Delta range balance and zero resistance current measurements were carried out using a Wenking LB75L potentiostat coupled to a Picolog ADC200 data logger as a ZRA (zero resistance ammeter). Corrosion failure measurements were carried out on a metallic pin supported across a 420 series stainless fishing hook (3.20 mm diameter and immersed surface area approx 1303 mm$^2$) with a 1 kg weight suspended from the center of the pin. The pin the support and the weight were immersed in sea water and time to failure was measured; the dimensions of the pin and the support immersed were noted.

Table 2 shows the measured corrosion rates for magnesium alloy when the alloy was coupled to stainless steel. Table 3 shows the measured corrosion rates for magnesium alloy when the alloy was coupled to mild steel. Table 4 shows the measured corrosion rates for magnesium alloys when coupled to stainless steel and mild steel.

TABLE 2

| Stainless Steel Area mm$^2$ | Magnesium Length mm | Area mm$^2$ | Current Amps | Corrosion rate mm/sec | mm/yr | mm/20 min |
|---|---|---|---|---|---|---|
| 509 | 18 | 248 | 0.0171 | 9.66E−06 | 305 | 0.012 |
| 1645 | 18 | 248 | 0.0228 | 1.28E−05 | 406 | 0.015 |
| 3410 | 18 | 248 | 0.0285 | 1.61E−05 | 508 | 0.019 |
| 5803 | 18 | 248 | 0.0305 | 1.72E−05 | 544 | 0.021 |
| 8823 Hook | 18 | 248 | 0.0375 | 2.11E−05 | 668 | 0.025 |
| 1342 | 14 | 193 | 0.0127 | 9.23E−06 | 291 | 0.011 |

TABLE 3

| Steel Area mm$^2$ | Magnesium length mm | Area mm$^2$ | Current Amps | Corrosion rate mm/sec | mm/yr | mm/20 min |
|---|---|---|---|---|---|---|
| 414 | 18 | 248 | 0.012 | 6.61E−06 | 209 | 0.008 |
| 1457 | 18 | 248 | 0.016 | 9.15E−06 | 289 | 0.011 |
| 3127 | 18 | 248 | 0.020 | 1.14E−05 | 358 | 0.014 |
| 5426 | 18 | 248 | 0.027 | 1.53E−05 | 483 | 0.018 |

TABLE 4

| Alloy | Stainless Steel Area mm$^2$ | Steel Area mm$^2$ | Magnesium Area mm$^2$ | Current Amps | Corrosion rate mm/sec | Area Ratio Anode/Cathode |
|---|---|---|---|---|---|---|
| M1 | 1303 | — | 838 | 0.029 | 2.38E−06 | 1.55 |
|  | 1303 | 980 | 838 | 0.062 | 5.18E−06 | 2.72 |
|  | 1303 | 980 | 89 | 0.026 | 2.08E−05 | 25.67 |
| M2 | 1303 | — | 881 | 0.02 | 1.59E−06 | 1.48 |
|  | 1303 | 980 | 881 | 0.055 | 4.36E−06 | 2.59 |
|  | 1303 | 980 | 128 | 0.034 | 1.83E−05 | 17.73 |
|  | 1303 | 980 | 65 | 0.021 | 2.35E−05 | 35.35 |
| M3 | 1303 | 980 | 604 | 0.042 | 4.83E−06 | 3.79 |
|  | 1303 | 980 | 364 | 0.034 | 6.58E−06 | 6.27 |
| AZ61 | 1303 | — | 889 | 0.028 | 2.20E−06 | 1.46 |
|  | 1303 | 980 | 889 | 0.051 | 4.01E−06 | 2.57 |
|  | 1303 | 980 | 124 | 0.033 | 1.88E−05 | 18.38 |
|  | 1303 | 980 | 57 | 0.021 | 2.56E−05 | 40.15 |

Based on the assumption that the corrosion rate obtained for the galvanic couple is the overall corrosion rate for the material, a cylinder will lose 0.022 mm from its diameter in 20 min when coupled to a 420 series stainless steel hook of diameter 4.50 mm and overall length 95 mm. Taking an average tensile strength for magnesium alloy to be 248 MPa, the minimum cross sectional area for a pin to support a load of 1 kg is 0.039 mm$^2$. This equates to a square pin of approximately 0.20 mm×0.20 mm.

Testing was therefore carried out by loading a pin fashioned from Mg alloy with approximate dimensions of 0.38 mm×0.40 mm. This was the smallest regular shape that could be constructed from the magnesium alloy available. The 1 kg weight was attached and the pin supported through the eye of the hook. The apparatus was placed in sea water and time to failure was recorded. The results were as follows:

| Magnesium Dimensions approx. (mm) | Time to Failure |
|---|---|
| 0.32 × 0.63 × 8.74 | 11 min 17 sec |
| 0.56 × 0.75 × 7.36 | 32 min 5 sec |

The above results show that a barrier, or a link between a barrier and a hook, can be produced to provide failure at a given time when immersed in seawater to achieve the desired result of providing an environmentally friendly corrodeable link between a barrier and hook.

Other modifications and variations may also be possible. It will be appreciated that the present invention encompasses all such variations and modifications that fall within its spirit and scope.

The invention claimed is:

1. An apparatus for mounting to a fish hook to reduce the likelihood of the hook being ingested by seabirds or turtles or to reduce or prevent hooking of a seabird or a turtle by the fish hook, the apparatus comprising a barrier and a degradable component, said degradable component mounting the barrier to the hook or retaining the barrier in a mounted position on the hook, wherein the barrier reduces a likelihood of the seabird becoming hooked by the hook when the barrier is mounted to the hook, said degradable component comprising a material that degrades in water and loses structural integrity such that the barrier moves away from the hook and a fishing line to which the hook is attached after a period of immersion of the barrier, degradable component and hook in water, wherein the barrier comprises a shield that is placed over a hook to shield the hook to thereby reduce or prevent ingestion of the hook or undesired hooking of a seabird or turtle by the hook, wherein the apparatus further comprises means for retaining the shield in a mounted position on the hook, said means for retaining comprising the degradable component, and said means for retaining comprising a pin.

2. The apparatus as claimed in claim 1 wherein the shield includes opposed surfaces that are positioned on either side of the hook and the pin passes through respective holes in the opposed surfaces to thereby facilitate retention of the pin in a mounted position on the hook.

3. The apparatus as claimed in claim 2 wherein the pin also passes through a hole or opening formed in the hook to retain the hook in position relative to the hook.

4. The apparatus as claimed in claim 1 wherein the degradable component comprises a mounting means for mounting the barrier to the hook.

5. The apparatus as claimed in claim 1 wherein the degradable component degrades by one of the following mechanisms:
   (a) corrosion when placed in water;
   (b) galvanic corrosion when placed in water;
   (c) the degradable component is made from or includes a metal or alloy that undergoes galvanic corrosion when the barrier is connected to the hook and placed in water; or
   (d) dissolution in water.

* * * * *